(12) United States Patent
Mori et al.

(10) Patent No.: US 12,154,724 B2
(45) Date of Patent: Nov. 26, 2024

(54) MULTILAYER CERAMIC CAPACITOR

(71) Applicant: Murata Manufacturing Co., Ltd., Nagaokakyo (JP)

(72) Inventors: Akito Mori, Nagaokakyo (JP); Masahiro Wakashima, Nagaokakyo (JP); Sho Watanabe, Nagaokakyo (JP); Takumi Endou, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 64 days.

(21) Appl. No.: 17/947,271

(22) Filed: Sep. 19, 2022

(65) Prior Publication Data

US 2023/0101251 A1 Mar. 30, 2023

(30) Foreign Application Priority Data

Sep. 28, 2021 (JP) .................................. 2021-157772

(51) Int. Cl.
*H01G 4/30* (2006.01)
*H01G 4/008* (2006.01)
*H01G 4/12* (2006.01)

(52) U.S. Cl.
CPC ............. *H01G 4/30* (2013.01); *H01G 4/0085* (2013.01); *H01G 4/1227* (2013.01)

(58) Field of Classification Search
CPC ....... H01G 4/30; H01G 4/0085; H01G 4/1227
See application file for complete search history.

(56) References Cited

U.S. PATENT DOCUMENTS

| 2004/0233612 | A1 | 11/2004 | Sugimoto et al. |
| 2012/0154978 | A1 | 6/2012 | Kim |
| 2014/0268489 | A1* | 9/2014 | Yamaguchi ............... H01G 4/12 |
| | | | 156/89.12 |
| 2015/0155099 | A1* | 6/2015 | Nishimura ........... C01G 25/006 |
| | | | 156/89.16 |
| 2015/0274597 | A1 | 10/2015 | Morigasaki et al. |
| 2020/0111613 | A1* | 4/2020 | Teraoka ................. H01G 4/012 |

(Continued)

FOREIGN PATENT DOCUMENTS

| CN | 104944941 A | 9/2016 |
| JP | 2004259897 A | 9/2004 |

(Continued)

OTHER PUBLICATIONS

Office Action in JP2021-157772, mailed Dec. 19, 2023, 12 pages.

(Continued)

*Primary Examiner* — Michael P McFadden
(74) *Attorney, Agent, or Firm* — Keating & Bennett, LLP

(57) ABSTRACT

A multilayer ceramic capacitor includes a multilayer body including an inner layer portion including internal electrode layers and inner dielectric layers laminated alternately, and internal electrode layers at both ends thereof in a lamination direction, and outer dielectric layers covering the inner layer portion, and two external electrodes on both end surfaces of the multilayer body in a length direction intersecting the lamination direction. The inner and outer dielectric layers each include grains, and a difference between an average grain size of grains in the inner dielectric layers and an average grain size of grains in the outer dielectric layers is about 100 nm or less.

19 Claims, 8 Drawing Sheets

(56) References Cited

U.S. PATENT DOCUMENTS

| | | | |
|---|---|---|---|
| 2020/0126731 A1* | 4/2020 | Yao | H01G 4/008 |
| 2020/0303125 A1* | 9/2020 | Tsuru | B32B 18/00 |
| 2020/0411246 A1 | 12/2020 | Yao et al. | |
| 2021/0159014 A1 | 5/2021 | Kowase | |
| 2022/0139624 A1* | 5/2022 | Sim | H01G 4/224 |
| | | | 361/301.4 |

FOREIGN PATENT DOCUMENTS

| | | |
|---|---|---|
| JP | 2012129494 A | 7/2012 |
| JP | 2021005665 A | 1/2021 |
| JP | 2021-082779 A | 5/2021 |

OTHER PUBLICATIONS

Decision of Refusal in JP2021-157772, mailed Mar. 5, 2024, 7 pages.
Official Communication issued in corresponding Chinese Patent Application No. 202210977986.2, mailed on Oct. 15, 2024, 7 pages.

* cited by examiner

FIG. 8

| | GRAIN SIZE OF INNER LAYER PORTION(nm) | GRAIN SIZE OF OUTER DIELECTRIC LAYER(nm) | DIFFERENCE IN GRAIN SIZE (nm) | Si CONTENT OF INNER LAYER PORTION (mol%) | Si AMOUNT OF OUTER LAYER (mol%) | BREAKDOWN VOLTAGE (V) |
|---|---|---|---|---|---|---|
| EXAMPLE 1 | 212 | 201 | 11 | 1.2 | 0.6 | 52 |
| EXAMPLE 2 | 210 | 179 | 31 | 1.2 | 0.6 | 53 |
| EXAMPLE 3 | 218 | 140 | 78 | 1.2 | 0.4 | 55 |
| EXAMPLE 4 | 213 | 239 | 26 | 1.2 | 0.7 | 48 |
| EXAMPLE 5 | 211 | 258 | 47 | 1.2 | 0.8 | 43 |
| EXAMPLE 6 | 256 | 260 | 4 | 1.4 | 0.8 | 40 |
| EXAMPLE 7 | 265 | 179 | 86 | 1.4 | 0.6 | 41 |
| EXAMPLE 8 | 180 | 261 | 81 | 0.8 | 0.8 | 42 |
| COMPARATIVE EXAMPLE | 210 | 347 | 137 | 1.2 | 1.5 | 27 |

MULTILAYER CERAMIC CAPACITOR

CROSS REFERENCE TO RELATED APPLICATIONS

This application claims the benefit of priority to Japanese Patent Application No. 2021-157772 filed on Sep. 28, 2021. The entire contents of this application are hereby incorporated herein by reference.

BACKGROUND OF THE INVENTION

1. Field of the Invention

The present invention relates to a multilayer ceramic capacitor.

2. Description of the Related Art

Multilayer ceramic capacitors are known in which a plurality of dielectric layers and a plurality of internal electrode layers are alternately laminated, and then fired. In recent years, such multilayer ceramic capacitors have been reduced in size and increased in capacitance. In order to achieve reduction in size and increase in capacitance, the internal electrode layers and the inner dielectric layers are thinned (for example, refer to Japanese Unexamined Patent Application Publication No. 2021-082779).

However, when the inner dielectric layers are thinned, the contact area between the inner dielectric layers and the dielectric layers in contact with the inner dielectric layers may decrease and, therefore, peeling may become easy, the breakdown voltage may decrease, and the withstand voltage reliability may decrease.

SUMMARY OF THE INVENTION

Preferred embodiments of the present invention provide multilayer ceramic capacitors each having high withstand voltage reliability.

A preferred embodiment of the present invention provides a multilayer ceramic capacitor that includes a multilayer body including an inner layer portion including a plurality of internal electrode layers and a plurality of inner dielectric layers laminated alternately therein, and internal electrode layers at both ends thereof in a lamination direction, and outer dielectric layers covering the inner layer portion and two external electrodes on end surfaces which are both surfaces of the multilayer body in a length direction intersecting the lamination direction, in which the inner dielectric layers and the outer dielectric layers each include grains, and a difference between an average grain size of grains in the inner dielectric layers and an average grain size of grains in the outer dielectric layers is 100 nm or less.

According to preferred embodiments of the present invention, it is possible to provide multilayer ceramic capacitors each having high withstand voltage reliability.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8 is a table showing values of breakdown voltages of the multilayer ceramic capacitor 1 including grains g having different grain sizes.

DETAILED DESCRIPTION OF THE PREFERRED EMBODIMENTS

Multilayer Ceramic Capacitor 1

Figure 1:
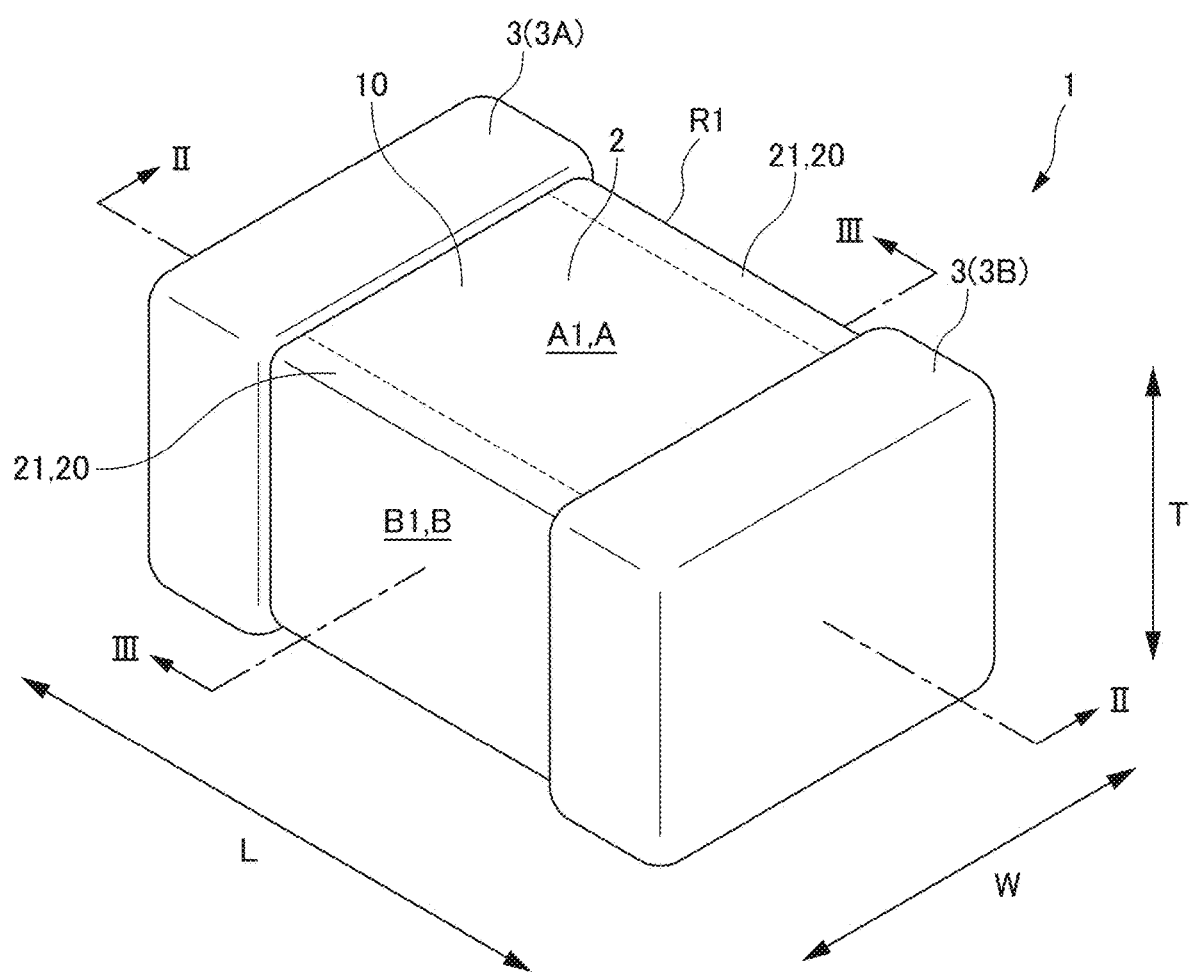
FIG. 1 is a schematic perspective view of a multilayer ceramic capacitor 1 according to a preferred embodiment of the present invention.
Figure 2:
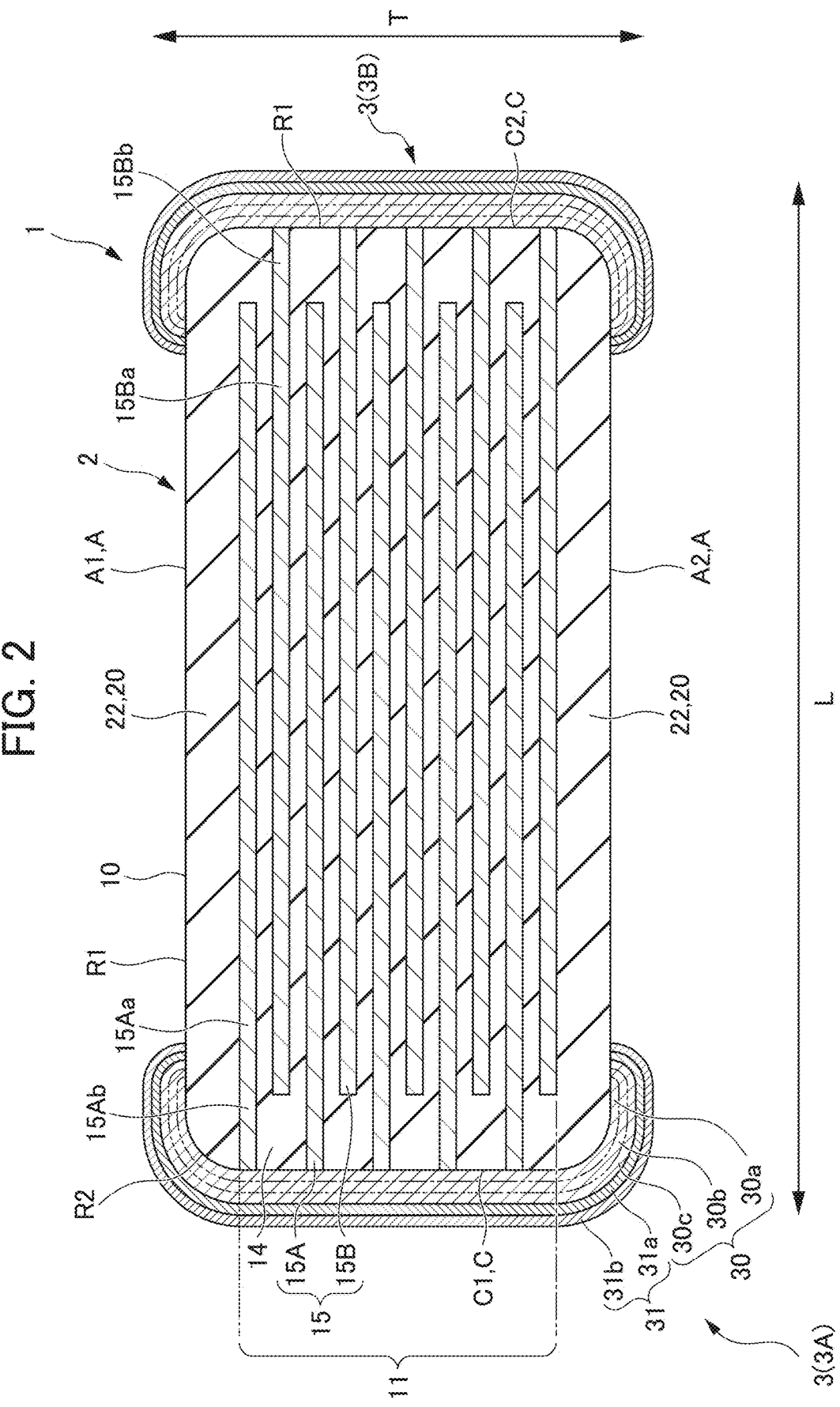
FIG. 2 is a cross-sectional view of the multilayer ceramic capacitor 1 taken along the line II-II in FIG. 1.
Figure 3:
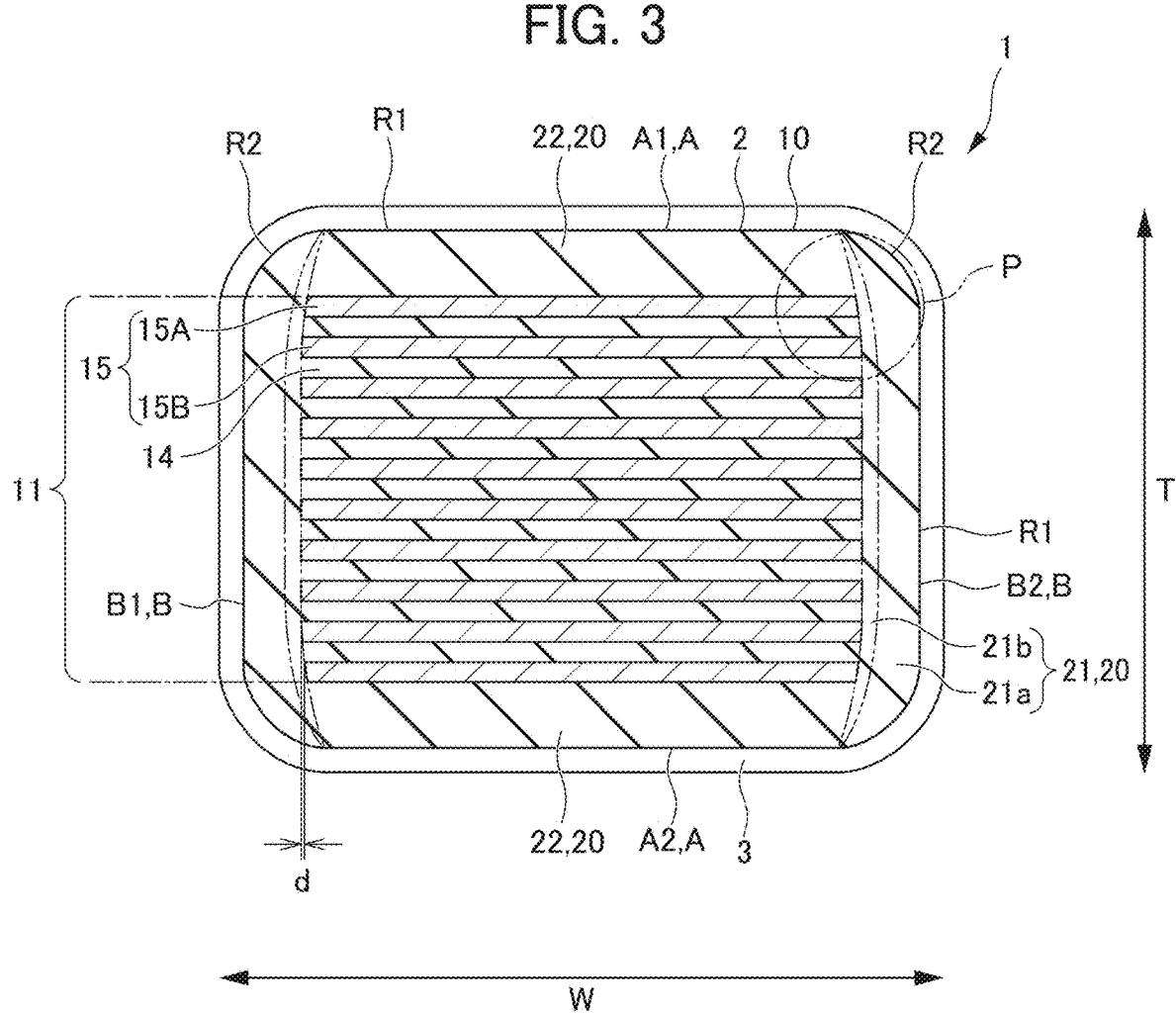
FIG. 3 is a cross-sectional view of the multilayer ceramic capacitor 1 taken along the line in FIG. 1.

Hereinafter, a multilayer ceramic capacitor 1 according to a preferred embodiment of the present invention will be described. FIG. 1 is a schematic perspective view of a multilayer ceramic capacitor 1 according to a preferred embodiment. FIG. 2 is a cross-sectional view of the multilayer ceramic capacitor 1 taken along the line II-II in FIG. 1. FIG. 3 is a cross-sectional view of the multilayer ceramic capacitor 1 taken along the line III-III in FIG. 1.

The multilayer ceramic capacitor 1 has a rectangular or substantially rectangular parallelepiped shape, and includes a multilayer body 2 and a pair of external electrodes 3 provided at both ends of the multilayer body 2. The multilayer body 2 includes an inner layer portion 11 in which inner dielectric layers 14 and internal electrode layers 15 are laminated, and outer dielectric layers 20 covering the inner layer portion 11.

Dimensions of Multilayer Ceramic Capacitor 1

The dimensions of the multilayer ceramic capacitor 1 are, for example, about 0.1 mm or more and about 0.5 mm or less in the width direction W, about 0.1 mm or more and about 0.5 mm or less in the thickness direction, and about 0.05 mm or more and about 1.0 or less in the length direction L.

In the following description, as a term indicating the orientation of the multilayer ceramic capacitor 1, a direction in which the pair of external electrodes 3 is provided in the multilayer ceramic capacitor 1 is referred to as the length direction L. A direction in which the inner dielectric layers 14 and the internal electrode layers 15 are laminated is referred to as a lamination (stacking) direction T. A direction intersecting both the length direction L and the lamination direction T is referred to as the width direction W. In a preferred embodiment, the width direction W is orthogonal or substantially orthogonal to both the length direction L and the lamination direction T. In the multilayer ceramic capacitor 1 of a preferred embodiment, the length direction L is longer than the width direction W and the lamination direction T. However, the present invention is not limited thereto, and the dimension in the length direction L may not be longer than the width direction W or the lamination direction T.

In the following description, among the six outer surfaces of the multilayer body 2, a pair of outer surfaces opposed to each other in the lamination direction T is referred to as a first main surface A1 and a second main surface A2, a pair of outer surfaces opposed to each other in the width direction W is referred to as a first side surface B1 and a second side surface B2, and a pair of outer surfaces opposed to each other in the length direction L is referred to as a first end surface C1 and a second end surface C2. The first main surface A1 and the second main surface A2 are collectively referred to as a main surface A when it is not necessary to be particularly distinguished from each other, the first side surface B1 and the second side surface B2 are collectively referred to as a side surface B when it is not necessary to be particularly distinguished from each other, and the first end surface C1 and the second end surface C2 are collectively referred to as an end surface C when it is not necessary to be particularly distinguished from each other.

Multilayer Body 2

The multilayer body 2 includes a multilayer body chip 10 and side margin portions 21 on both sides of the multilayer body chip 10 in the width direction W. The multilayer body chip 10 includes the inner layer portion 11 in which the inner dielectric layers 14 and the internal electrode layers 15 are laminated, and the two outer layer portions 22 provided on both sides of the inner layer portion 11 in the lamination direction T. In a preferred embodiment, a combination of the outer layer portions 22 and the side margin portions 21 corresponds to the outer dielectric layers 20 covering the inner layer portion 11.

Although the multilayer body 2 has a rectangular or substantially rectangular parallelepiped shape, it is preferable that corner portions R1 and ridge portions R2 are rounded. The corner portions R1 are where the main surface A, the side surface B, and the end surface C intersect with each other. The ridge portions R2 are where two surfaces of the multilayer body 2, that is, the main surface A and the side surface B, the main surface A and the end surface C, or the side surface B and the end surface C intersect with each other.

Inner Layer Portion 11

The inner layer portion 11 is a portion in which the inner dielectric layers 14 and the internal electrode layers 15 are alternately laminated along the lamination direction T, and in a preferred embodiment, both ends of the inner layer portion 11 in the lamination direction T correspond to the internal electrode layers 15. That is, in the inner layer portion 11, the inner dielectric layers 14 and the internal electrode layers 15 are alternately laminated between the internal electrode layer 15 and the internal electrode layer 15.

Internal Electrode Layer 15

The internal electrode layers 15 include a plurality of first internal electrode layers 15A and a plurality of second internal electrode layers 15B. The first internal electrode layers 15A and the second internal electrode layers 15B are alternately provided. The first internal electrode layers 15A and the second internal electrode layers 15B are collectively described as the internal electrode layer 15 when it is not necessary to distinguish them from each other.

The internal electrode layer 15 may include, for example, Ni (nickel) as a main component, and the internal electrode layer 15 may further include dielectric particles having the same composition as the ceramics contained in the inner dielectric layers 14. S (sulfur) is segregated at the interface with the inner dielectric layers 14. In addition, Sn (tin) may be provided at the interface between the internal electrode layer 15 and the inner dielectric layer 14. In this case, Sn may be layered or dotted. Furthermore, Sn may be solidly dissolved on the internal electrode layer 15 side, or may be solidly dissolved in the dielectric particles on the dielectric layer side.

The first internal electrode layer 15A includes a first counter portion 15Aa opposed to a second internal electrode layer 15B, and a first extension portion 15Ab extending from the first counter portion 15Aa toward the first end surface C1. An end portion of the first extension portion 15Ab is exposed at the first end surface C1, and is electrically connected to a first external electrode 3A described later. The second internal electrode layer 15B includes a second counter portion 15Ba opposed to the first internal electrode layer 15A, and a second extension portion 15Bb extending from the second counter portion 15Ba toward the second end surface C2. An end portion of the second extension portion 15Bb is electrically connected to a second external electrode 3B described later. In the internal electrode layer 15, charges are accumulated between the first counter portion 15Aa of the first internal electrode layer 15A and the second counter portion 15Ba of the second internal electrode layer 15B with the inner dielectric layer 14 interposed therebetween, and thus the internal electrode layer 15 defines and functions as a capacitor.

As shown in FIG. 3, in a cross section WT, which is a cross section in the width direction W and the lamination direction T passing through the center of the multilayer body 2, the displacement d in the lamination direction T of the positions of the ends in the width direction W of the two adjacent first internal electrode layer 15A and the second internal electrode layer 15B in the lamination direction T is preferably, for example, about 5 µm or less, and more preferably about 0.5 µm or less.

In other words, the ends in the width direction W of the first internal electrode layer 15A and the second internal electrode layer 15B adjacent to each other in the lamination direction T are at the same or substantially at the same position in the width direction W, and the positions of the ends thereof are aligned in the lamination direction T.

The number of internal electrode layers 15 is preferably, for example, 10 or more and 1000 or less.

The thickness of the internal electrode layer 15 is preferably, for example, about 0.3 µm or more and about 0.4 µm or less, and more preferably about 0.3 µm or more and about 0.35 µm or less.

The thickness of the internal electrode layer 15 is measured, for example, as follows. First, the cross section LT passing through the center of the multilayer ceramic capacitor 1 is polished to expose the inner layer portion 11.

If necessary, the exposed cross section at the observation position is etched to remove the conductive layer stretched by polishing.

Figure 4:
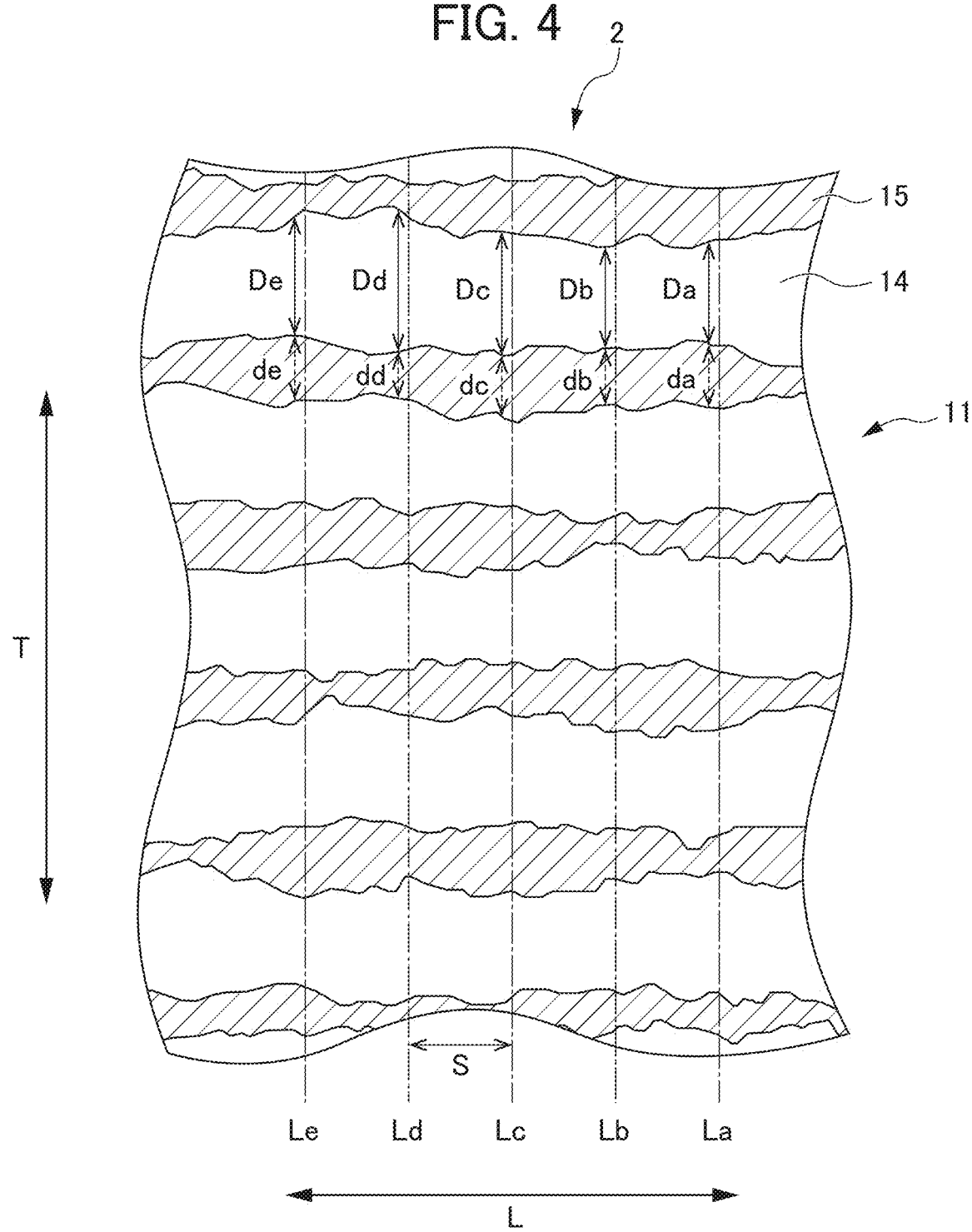
FIG. 4 is an example of an enlarged image of a cross section of an exposed inner layer portion 11.

FIG. 4 is an enlarged image of a cross section of the exposed inner layer portion 11. In the enlarged image shown in the figure, for example, a plurality of straight lines La, Lb, Lc, Ld, and Le extending in the lamination direction T are drawn at equal intervals at a pitch S. The pitch S is preferably, for example, about 5 times to about 10 times the thickness of the internal electrode layer 15 to be measured, for example, and in the case of measuring the internal electrode layer 15 with a thickness on the order of, for example, about 1 µm, the pitch S is set at, for example, about 5 µm.

Next, the thicknesses da, db, dc, dd, and de of the respective internal electrode layers 15 are measured on the respective straight lines of the five straight lines La, Lb, Lc, Ld, and Le. However, in a case in which the internal electrode layer 15 is missing on the straight lines La, Lb, Lc, Ld, and Le and the inner dielectric layers 14 sandwiching the internal electrode layer 15 are connected to each other, or in a case in which the enlarged view of the measurement position is unclear, a new straight line is drawn and the thickness of the internal electrode layer 15 is measured.

When the number of laminated internal electrode layers 15 is less than 5, the thicknesses of all internal electrode layers 15 are measured by the above-described method, and the average value thereof is set as the average thickness of a plurality of internal electrode layers 15. The thickness of the inner dielectric layer 14 can be measured similarly to that of the internal electrode layer 15.

Inner Dielectric Layer 14

The inner dielectric layer 14 is, for example, a dielectric ceramic including Ba and Ti components, and includes Si. Furthermore, a component having a content lower than that of a main component such as, for example, a Mn compound, an Fe compound, a Cr compound, a Co compound, or a Ni compound may be added to these components. The molar ratio of Si to Ti in the inner dielectric layer 14 is, for example, about 0.8 mol % or more and about 1.4 mol % or less in a preferred embodiment. However, the present invention is not limited thereto. The Si content can be calculated by TEM analysis.

Figure 5:
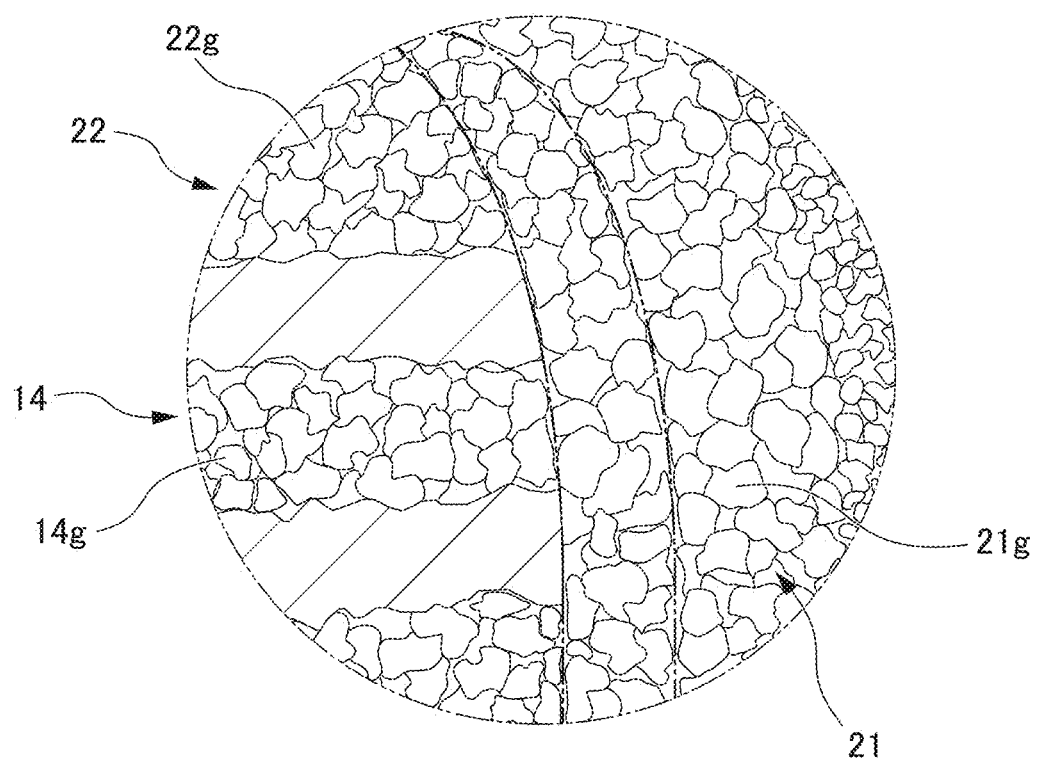
FIG. 5 is an enlarged view of a circled portion P in FIG. 3.

Furthermore, the inner dielectric layer 14 includes a plurality of grains (granular material) 14g. FIG. 5 is an enlarged view of a circled portion P in FIG. 3. The grains 14g are, for example, a barium titanate-based ceramic such as a perovskite compound including Ba and Ti, and contains Si and other subcomponents. The subcomponent is at least one selected from the group including, for example, La, Ce, Pr, Nd, Sm, Eu, Gd, Tb, Dy, Ho, Er, Tm, Yb, Lu and Y. The grain size of the grains 14g contained in the inner dielectric layer 14 is, for example, about 140 nm or more and about 270 nm or less.

Measurement Method of Grain Size

The grain size of the grain 14g of the inner dielectric layer 14 refers to the grain size in the middle in the width direction W and in the middle in the length direction L. Furthermore, the grain size of the grain 22g of the outer layer portion 22, which will be described later, refers to the grain size in the middle in the width direction W and in the middle in the length direction L, and the grain size of the grain 21g of the side margin portion 21 refers to the grain size in the middle in the width direction W and in the middle in the lamination direction T. In a case in which the side margin portions 21 each include a plurality of layers, the side margin portion 21 is divided into a plurality of regions 20 nm, each in the width direction W from the side surface B side, the area of each of the grains 21g in each region is measured and converted into a circle equivalent diameter, and the average grain size in each region is defined as the grain size of each region. In the region of less than about 20 nm, the average grain size within the region of less than about 20 nm is defined as the grain size of the region. The grain size of the grain 21g of the entire or substantially the entire side margin portion 21 refers to a grain size obtained by further averaging the average grain size of each region. In the following description, in a case in which the grain 14g of the inner dielectric layer 14, the grain 22g of the outer layer portion 22, and the grain 21g of the side margin portion 21 are not distinguished from each other, they are collectively referred to as the grain g.

Each grain size can be measured using a transmission electron microscope (TEM). For example, in the range of about 10 μm× about 10 μm of the field of view, the area of the grain g in the field of view is measured, the circle equivalent diameter is calculated for each grain g, and the average value of the circle equivalent diameter is set as the grain size.

Number of Inner Dielectric Layers 14

The total number of the inner dielectric layers 14 and the outer layer portions 22 is preferably, for example, 100 or more and 2000 or less.

Thickness of Inner Dielectric Layer 14

The thickness of the inner dielectric layer 14 is preferably, for example, about 0.4 μm or more and about 0.5 μm or less, and more preferably about 0.4 μm or more and about 0.45 μm or less. As described above, the thickness of the inner dielectric layer 14 can also be calculated by measuring the thicknesses Da, db, Dc, Dd, and De of the inner dielectric layers 14 on the respective straight lines of the five straight lines La, Lb, Lc, Ld, and Le as in the internal electrode layer 15 and averaging them.

Outer Dielectric Layer 20

The outer dielectric layers 20 covering the inner layer portion 11 each include the outer layer portions 22 and the side margin portions 21. The outer dielectric layers 20 are each made of the same material as the inner dielectric layer 14, and each include the plurality of grains 22g and the plurality of grains 21g. However, the molar ratio of Si to Ti in the outer dielectric layers 20 is smaller than that of the inner dielectric layer 14, and is preferably, for example, about 0.8 mol % or less and about 0.5 mol % or less. The outer dielectric layers 20 includes, for example, Ni.

The grain size of the grain g included in the inner dielectric layers 14 and the outer dielectric layers 20 is, for example, about 140 nm or more and about 270 nm or less. The average grain size of the grains 14g included in the inner dielectric layer 14 is equal or substantially equal to the average grain size of the grains 22g and 21g included in the outer dielectric layers 20, and the difference in grain size is, for example, about 100 nm or less. The difference between the average grain size of the grains 14g included in the inner dielectric layer 14 and the average grain size of the grains 22g and 21g included in the outer dielectric layer 20 is, for example, about 36% or less when expressed by percentage.

Outer Layer Portion 22

The outer layer portions 22 are dielectric layers located adjacent to the respective main surfaces A of the multilayer body 2, and located between the respective main surfaces A and the internal electrode layers 15 closest to the respective main surfaces A.

Side Margin Portion 21

The side margin portions 21 are provided on both side surfaces B of the multilayer body chip 10, that is, on both side surfaces B of the outer layer portion 22 and the inner layer portion 11, and cover the side surfaces B of the outer layer portion 22 and the inner layer portion 11. A range of a certain width on the side surface B side of the laminated body chip 10 refers to the side margin portion 21.

The side margin portion 21 of a preferred embodiment has a two-layer structure including an outer layer 21a positioned on the outer side and an inner layer 21b positioned on the internal electrode layer 15 side. However, the present invention is not limited thereto, and the side margin portion 21 may include one layer, or may include two or more layers. In a case in which the side margin portion 21 includes a plurality of layers, this can be confirmed by the dark field of the optical microscope, or can be discerned by an additive or the like segregating between the layers. The inner layer 21b of a preferred embodiment has a thickness of, for example, about 1/10 of that of the outer layer 21a, and is considerably thinner than the outer layer 21a.

In the side margin portion 21, as described above as the outer dielectric layer 20, the molar ratio of Si to Ti when averaged as a whole is less than that of the inner dielectric layer 14, and is, for example, about 0.8 mol % or less, and preferably about 0.5 mol % or less. The Si content of the entire side margin portion 21 may be summed after individually calculating the Si content of the outer layer 21*a* and the inner layer 21*b*.

When the side margin portion 21 includes two layers, the molar ratio of Si to Ti in the inner layer 21*b* is lower than the molar ratio of Si to Ti in the outer layer 21*a*. In a case of a plurality of layers as well, when the outermost side margin portion is the outer layer 21*a* and the innermost side margin portion is the inner layer 21*b*, the molar ratio of Si to Ti in the inner layer 21*b* is smaller than the molar ratio of Si to Ti in the outer layer 21*a*. Specifically, the molar ratio of Si to Ti in the inner layer 21*b* is, for example, about 0.01 mol % to about 0.1 mol %, and is preferably almost zero. The molar ratio of Si to Ti in the outer layer 21*a* is, for example, about 0.8 mol % or less, and preferably about 0.5 mol % or less.

Furthermore, in the side margin portion 21, the grain size of the grain of the dielectric of the side margin portion 21 decreases from the inner layer toward the outer side.

External Electrode 3

The external electrode 3 includes a first external electrode 3A provided on the first end surface C1 of the multilayer body 2 and a second external electrode 3B provided on the second end surface C2 of the multilayer body 2. The first external electrode 3A and the second external electrode 3B are collectively described as the external electrode 3 when it is not necessary to distinguish them from each other. The external electrode 3 covers not only the end surface C, but also a portion of each of the main surface A and the side surface B on the end surface C side.

As described above, the end portion of the first extension portion 15Ab of the first internal electrode layer 15A is exposed at the first end surface C1, and is electrically connected to the first external electrode 3A. Furthermore, the end portion of the second extension portion 15Bb of the second internal electrode layer 15B is exposed at the second end surface C2, and is electrically connected to the second external electrode 3B. Thus, a plurality of capacitor elements are electrically connected in parallel between the first external electrode 3A and the second external electrode 3B.

In a preferred embodiment, the external electrodes 3 each include a base electrode layer 30 and a plated layer 31 provided on the base electrode layer 30.

Base Electrode Layer 30

The base electrode layer 30 includes at least one layer selected from the group including, for example, a fired layer 30*a*, a conductive resin layer 30*b*, and a thin film layer 30*c*. A preferred embodiment includes the three layers of the fired layer 30*a*, the conductive resin layer 30*b*, and the thin film layer 30*c*.

Fired Layer 30*a*

The metal of the fired layer 30*a* includes, for example, at least one selected from Cu, Ni, Ag, Pd, Ag—Pd alloy, Au, and the like. The fired layer 30*a* may include a single layer or a plurality of layers. A conductive paste including glass and metal is applied to the multilayer body 2 and fired to form the fired layer 30*a*. Although the fired layer 30*a* is fired simultaneously with the internal electrode layer 15 in a preferred embodiment, the fired layer 30*a* may be fired after firing the internal electrode layer 15.

Conductive Resin Layer 30*b*

The conductive resin layer 30*b* includes, for example, conductive particles and a thermosetting resin in a preferred embodiment. As a specific example of the thermosetting resin, various known thermosetting resins such as epoxy resin, phenol resin, urethane resin, silicone resin, and polyimide resin can be used. As the metal component, for example, Ag or a metal powder obtained by coating the surface of the base metal powder with Ag can be used. When the conductive resin layer 30*b* is prepared, the conductive resin layer 30*b* may be provided directly on the multilayer body 2 without forming the fired layer 30*a*. The conductive resin layer 30*b* may include a single layer or a plurality of layers.

Since the conductive resin layer 30*b* includes a thermosetting resin, it is more flexible than, for example, the fired layer 30*a* made of a fired product of a plating film or a conductive paste. For this reason, even when a physical impact or an impact caused by thermal cycling is applied to the multilayer ceramic capacitor 1, the conductive resin layer 30*b* defines and functions as a buffer layer to prevent the generation of cracks in the multilayer ceramic capacitor 1, and the multilayer ceramic capacitor 1 easily absorbs piezoelectric vibration and has an advantageous effect of reducing or preventing "acoustic noise".

Thin Film Layer 30*c*

The thin film layer 30*c* is formed by a thin film forming method such as, for example, sputtering or vapor deposition, and has a thickness of, for example, about 1 µm or less on which metal particles are deposited.

Plated Layer 31

The plated layer 31 preferably includes plating of one metal selected from the group including, for example, Cu, Ni, Sn, Pb, Au, Ag, Pd, Bi, Zn, and Ag—Pd alloy, or an alloy including the metal. The plated layer 31 preferably includes a plurality of layers, and in a preferred embodiment, the plated layer 31 includes a first plated layer 31*a* and a second plated layer 31*b* provided on the first plated layer 31*a*. In a preferred embodiment, the first plated layer 31*a* is Ni plating, and the second plated layer 31*b* is Sn plating, for example. The Ni plated layer 31 can prevent the base electrode layer 30 from being eroded by solder when mounting the ceramic electronic component.

The Sn plated layer 31 improves wettability of solder when mounting the ceramic electronic component, and can be easily mounted.

The external electrode 3 does not include the base electrode layer 30. The plated layer 31 may be provided directly on the multilayer body 2. In this case, the internal electrode layer 15 and the plated layer 31 are directly connected to each other. In this case, a catalyst may be provided on the multilayer body 2 as a pretreatment.

In this case, the plated layer 31 preferably includes a first plated layer 31*a* and a second plated layer 31*b* provided on the first plated layer 31*a*. The first plated layer 31*a* and the second plated layer 31*b* preferably include, for example, plating of one of metals selected from the group including Cu, Ni, Sn, Pb, Au, Ag, Pd, Bi and Zn or an alloy including the metal. For example, when Ni is used as the internal electrode layer 15, it is preferable to use Cu, which has good bonding property with Ni, as the first plated layer 31*a*.

Sn or Au having good solder wettability is preferably used as the second plated layer 31*b*, and Ni having solder barrier performance is preferably used as the first plated layer 31*a*.

The second plated layer 31*b* may be provided as necessary, and the external electrode 3 may include the first plated layer 31*a*. The second plated layer 31*b* may be provided as the outermost layer of the plated layer 31, or another plated layer may be provided on the second plated layer 31*b*. The plated layer 31 preferably does not contain glass. The plated layer 31 preferably has a metal proportion of, for example, about 99% by volume or more per unit volume thereof.

Method of Manufacturing Multilayer Ceramic Capacitor 1

Figure 6:
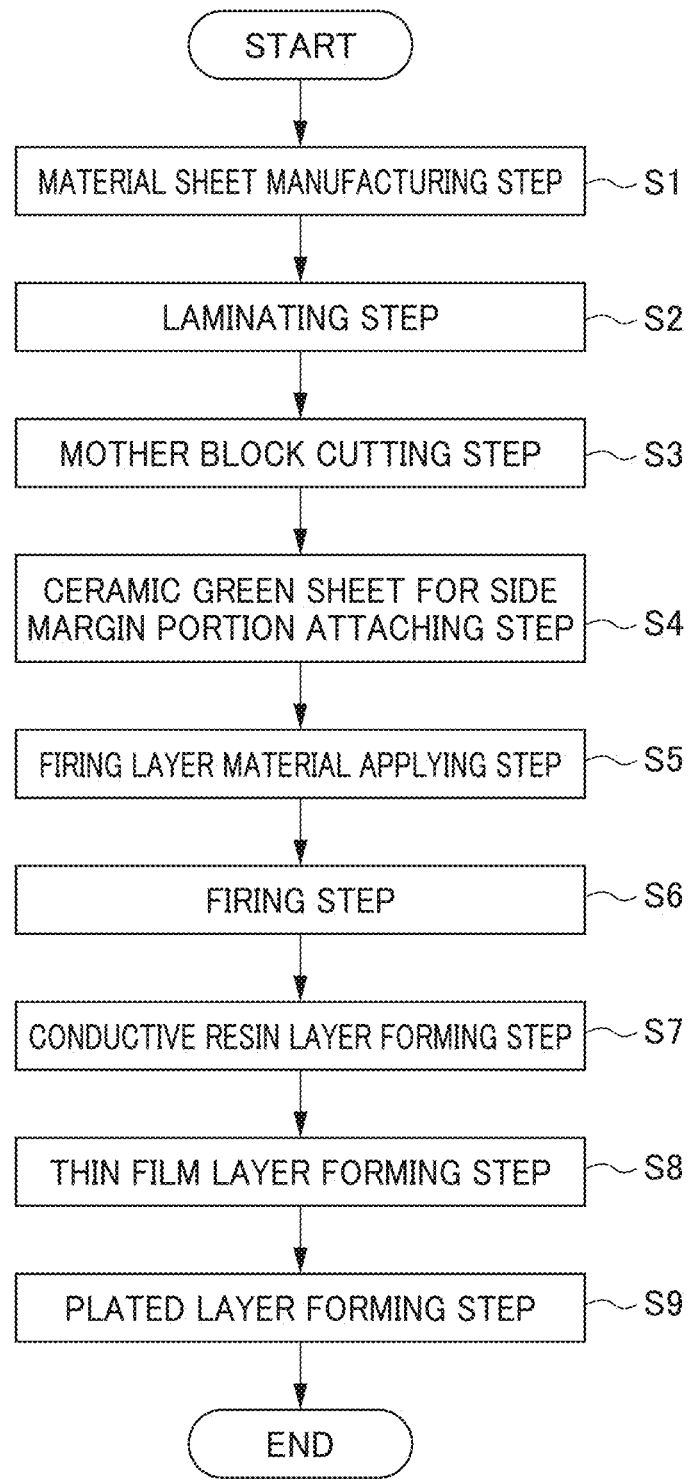
FIG. 6 is a flowchart of a method of manufacturing the multilayer ceramic capacitor 1.
Figure 7:
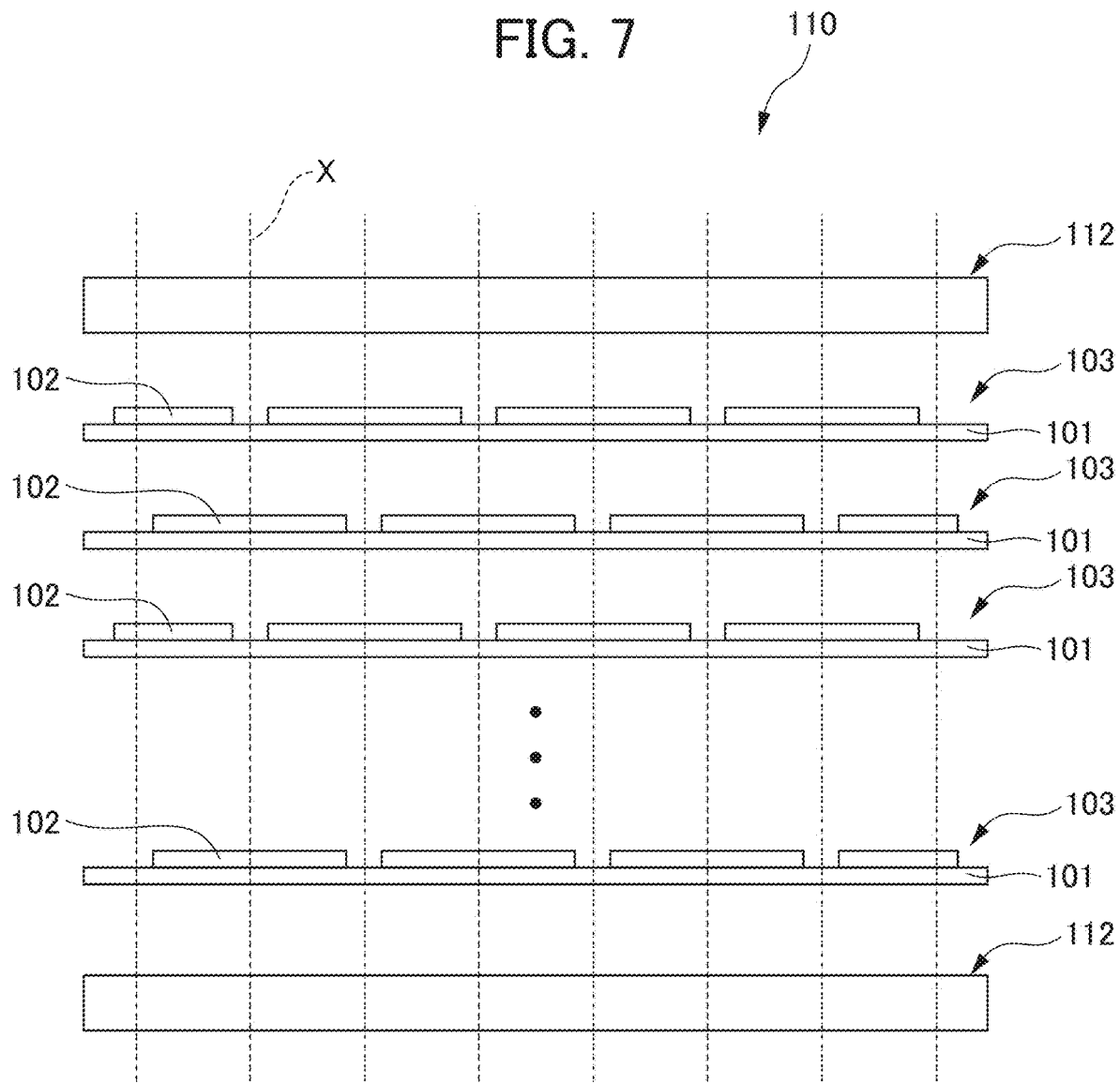
FIG. 7 is a diagram of a method of manufacturing the multilayer ceramic capacitor 1.

FIG. 6 is a flowchart of a non-limiting example of a method of manufacturing the multilayer ceramic capacitor 1. FIG. 7 is a diagram of a non-limiting example of a method of manufacturing the multilayer ceramic capacitor 1.

Material Sheet Manufacturing Step S1

First, a ceramic slurry for an inner dielectric layer including Ba, a ceramic powder including a Ti component, a binder, a solvent, and Si is prepared. The molar ratio of Si to Ti in the ceramic slurry for the inner dielectric layer is, for example, about 0.8 mol % or more and about 1.4 mol % or less. The ceramic slurry for the inner dielectric layer is formed into a sheet shape on a carrier film using, for example, a die coater, a gravure coater, a micro gravure coater, or the like, such that the ceramic green sheet 101 for the inner dielectric layer is manufactured.

Subsequently, the conductive paste including Ni is printed on the inner dielectric layer ceramic green sheet 101 by, for example, screen printing, ink jet printing, gravure printing or the like so as to have a strip-shaped pattern, such that the conductive pattern 102 is formed. Thus, the material sheet 103 in which the conductive pattern 102 defining and functioning as the internal electrode layer 15 is printed on the surface of the ceramic green sheet 101 defining and functioning as the inner dielectric layer 14 is manufactured.

Similarly to the ceramic slurry for the inner dielectric layer, a ceramic slurry for the outer layer portion including a ceramic powder including Ba and Ti components, a binder, a solvent, and Si is prepared. The outer layer ceramic slurry is formed into a sheet shape on a carrier film using, for example, a die coater, a gravure coater, a micro gravure coater, or the like, such that the outer layer ceramic green sheet 112 is manufactured. The molar ratio of Si to Ti in the ceramic slurry for the outer layer portion is less than that of the ceramic slurry for the inner dielectric layer, and is, for example, about 0.8 mol % or less, and preferably about 0.5 mol % or less.

Lamination Step S2

Subsequently, a plurality of material sheets 103 are laminated. As shown in FIG. 7, the plurality of material sheets 103 are laminated such that the belt-shaped conductive patterns 102 are oriented in the same direction and the belt-shaped conductive patterns 102 are displaced by half pitch in the width direction W between the adjacent material sheets 103. Furthermore, ceramic green sheets 112 for the outer layer portion, which function as the outer layer portion 22, are laminated on both sides of the plurality of laminated material sheets 103.

Next, the ceramic green sheet 112 for the outer layer portion and the plurality of stacked material sheets 103 are thermocompression bonded to each other, thus manufacturing a mother block 110.

Mother Block Cutting Step S3

Subsequently, the mother block 110 is cut along a cutting line X corresponding to the dimension of the multilayer body chip 10 and a cutting line (not shown) intersecting with the cutting line X shown in FIG. 7. Thus, a plurality of multilayer body chips 10 are manufactured.

Ceramic Green Sheet for Side Margin Portion Attaching Step S4

A ceramic slurry for the inner layer including Ba, a ceramic powder including a Ti component, a binder, a solvent, and a trace amount of Si, and a ceramic slurry for the outer layer including Ba, a ceramic powder including a Ti component, a binder, a solvent, and more Si than the ceramic green sheet for the inner layer are prepared.

More specifically, the molar ratio of Si to Ti in the ceramic slurry for the inner layer is preferably, for example, about 0.01 mol % to about 0.1 mol %, and the molar ratio of Si to Ti in the ceramic slurry for the outer layer is preferably, for example, about 0.8 mol % or less, more preferably about 0.5 mol % or less.

A ceramic green sheet having a two-layer structure is manufactured by applying and drying the ceramic slurry for the outer layer on the surface of the carrier film, and applying and drying the ceramic slurry for the inner layer thereon.

Then, the ceramic green sheet is peeled off from the carrier film, and the ceramic green sheet for the inner layer of the ceramic green sheet and the side surface of the multilayer body chip 10 are opposed to each other, and pressed and punched, such that the ceramic green sheet for the side margin portion is attached to the side surface of the multilayer body chip 10.

Fired Layer Material Application Step S5

The material of the fired layer 30a of the base electrode layer 30 is attached to both end surfaces C of the multilayer body chip 10 to which the ceramic green sheet for the side margin portion is attached.

Firing Step S6

Then, the multilayer body chip 10 to which the material of the fired layer 30a is attached is degreased under a predetermined condition in, for example, a nitrogen atmosphere, and fired and sintered at a predetermined temperature in a mixed atmosphere of, for example, nitrogen-hydrogen-water vapor, to obtain the multilayer body 2 in which the fired layer 30a and the conductive resin layer 30b are formed.

In this firing step, the dielectric grains g are formed in the outer dielectric layer 20 in which the outer layer portion 22 and the side margin portion 21 are combined, and the inner dielectric layer 14. The grain size of the grains g can be adjusted by the Si content. When the Si content is large, the grain size of the grains g becomes small, and when the Si content is small, the grain size of the grains g becomes large. For example, when the multilayer body 2 is fired, the grain size of the grains g of the multilayer body 2 tends to decrease toward the outer surface of the multilayer body 2. By adjusting the Si content of the multilayer body 2, it is possible to reduce or prevent an excessive change in the grain size of the grains g of the multilayer body 2.

In a preferred embodiment, the inner dielectric layers 14 and the outer dielectric layers 20 include, for example, Si and Ti. The molar ratio of Si to Ti in the inner dielectric layers 14 is greater than the molar ratio of Si to Ti in the outer dielectric layers 20. Specifically, the molar ratio of Si to Ti in the inner dielectric layers 14 is, for example, about 0.8 mol % or more and about 1.4 mol % or less. The molar ratio of Si to Ti in the outer dielectric layers 20 is, for example, about 0.8 mol % or less.

Therefore, it can be assumed that the grain sizes of the grains 21g and 22g of the outer dielectric layers 20 having a smaller Si content than the inner dielectric layer 14 are larger than that of the grains 14g of the inner dielectric layers 14. However, when fired, even though the Si content is the same or substantially the same, the grains 21g and 22g of the outer dielectric layer 20 located on the outer side tend to be smaller than those in the case where the outer dielectric layer 20 is located on the inner side. Furthermore, Ni is included in the outer dielectric layers 20, and the growth of grains of the outer dielectric layers 20 is reduced or prevented by Ni.

Therefore, according to a preferred embodiment, after sintering, the grain size of the outer dielectric layers 20 is equal or substantially equal to the grain size of the outer dielectric layers 20, that is, the difference in grain size is, for example, about 100 nm or less.

Since the inner layer 21b is considerably thinner than the outer layer 21a, the proportion of the Si content of the inner layer 21b contributing to the determination of the grain size of the grain 21g is small. Therefore, the content of Si in the outer layer 21a is dominant in forming the grain size before sintering.

Conductive Resin Layer Forming Step S7

Next, the material of the conductive resin layer 30b including the conductive particles and the thermosetting resin is adhered to the fired layer 30a.

Thin Film Layer forming Step S8

Furthermore, on the material of the conductive resin layer 30b in the multilayer body 2, a thin film layer 30c having a thickness of, for example, about 1 μm or less in which metal particles are deposited by a thin film forming method such as, for example, sputtering or vapor deposition is formed.

Plated layer Forming Step S9

In a preferred embodiment, as the plated layer 31, a first plated layer 31a which is a Ni plated layer and a second plated layer 31b which is Sn plating are formed on the first plated layer 31a. Through the above steps, the multilayer ceramic capacitor 1 is manufactured.

Advantageous Effects

The multilayer ceramic capacitor 1 of a preferred embodiment as described above has the following advantageous effects. The interfaces are provided at which the inner dielectric layers 14 and the side margin portions 21 of the outer dielectric layers 20 are in contact with each other at both side surfaces B of the inner layer portion 11. Interfaces are provided at which the inner dielectric layers 14 and the outer layer portions 22 of the outer dielectric layers 20 are in contact with each other at the end surfaces C where the extension portions 15b of the internal electrode layers 15 provided adjacent to both main surfaces A of the inner layer portion 11 do not extend. At the interfaces where the inner dielectric layers 14 and the outer dielectric layers 20 are in contact with each other, when the grain size difference of the grain g contained in the dielectric layer is large, the difference in compressive stress becomes large, and the interface tends to be peeled off, and the breakdown voltage may be lowered.

However, in a preferred embodiment, the average grain size of the grains 14g included in the inner dielectric layer 14 is equal or substantially equal to the average grain size of the grains 21g and the grains 22g included in the outer dielectric layers 20, and the difference in grain size is, for example, about 100 nm or less.

Therefore, a difference in compressive stress is less likely to occur at the interfaces between the inner dielectric layers 14 and the outer dielectric layers 20, a decrease in dielectric breakdown voltage can be prevented, withstand voltage reliability can be improved, and capacitance can be improved.

Furthermore, since the electric field also flows around both end portions in the width direction W in the side margin portion 21, when the grain size in the side margin portion 21 is large, it will be disadvantageous. However, it will be improved with smaller grain size difference.

Test Examples

By adjusting the content of Si included in each of the internal electrode layers 15 and the outer dielectric layers 20, the multilayer ceramic capacitor 1 having different grain sizes of grains g included in each of the internal electrode layers 15 and the outer dielectric layers 20 was manufactured. Then, a voltage was applied between the external electrodes 3 of each of the multilayer ceramic capacitors 1 at a step-up rate of about 50 V/sec, and the voltage at the time of dielectric breakdown was measured. FIG. 8 is a table showing the values of the breakdown voltages.

As shown in the table, in each of Examples 1 to 8, the grain size difference was about 100 nm or less. At this time, the breakdown voltage (BVD) was about 40 V or more.

On the other hand, in the comparative example, the grain size difference was about 137 nm. At this time, the breakdown voltage (BVD) became as low as about 27 V.

As described above, the multilayer ceramic capacitor 1 having a grain size difference of about 100 nm or less of the grain g included in each of the internal electrode layers 15 and the outer dielectric layers 20 according to the Examples of the present invention could improve the dielectric breakdown voltage as compared with the comparative example in which the grain size difference of the grain g was larger than about 100 nm, thus providing the multilayer ceramic capacitor 1 having high withstand voltage reliability.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including:
      an inner layer portion including a plurality of internal electrode layers and a plurality of inner dielectric layers laminated alternately, and internal electrode layers of the plurality of internal electrode layers at both ends thereof in a lamination direction; and
      outer dielectric layers covering the inner layer portion; and
   two external electrodes on end surfaces of the multilayer body in a length direction intersecting the lamination direction; wherein
   the inner dielectric layers and the outer dielectric layers each include grains;
   a difference between an average grain size of grains in the inner dielectric layers and an average grain size of grains in the outer dielectric layers is about 100 nm or less;
   the inner dielectric layers and the outer dielectric layers each include Si and Ti; and
   a molar ratio of Si to Ti in the inner dielectric layers is higher than a molar ratio of Si to Ti in the outer dielectric layers.

2. The multilayer ceramic capacitor according to claim 1, wherein the grain size of the grains is about 140 nm or more and about 270 nm or less.

3. The multilayer ceramic capacitor according to claim 1, wherein
   the molar ratio of Si to Ti in the inner dielectric layers is about 0.8 mol % or more and about 1.4 mol % or less.

4. The multilayer ceramic capacitor according to claim 1, wherein
   the molar ratio of Si to Ti in the outer dielectric layers is about 0.8 mol % or less.

5. The multilayer ceramic capacitor according to claim 1, wherein
the outer dielectric layers include outer layer portions on both sides of the inner layer portion in the lamination direction; and
the outer layer portions each include Si and Ti, and a molar ratio of Si to Ti in the outer layer portions is about 0.5 mol % or less.

6. The multilayer ceramic capacitor according to claim 1, wherein
the outer dielectric layers include side margin portions on both sides of the inner layer portion in a width direction intersecting the lamination direction and the length direction;
the side margin portions each include Si and Ti; and
a molar ratio of Si to Ti in the side margin portions is about 0.5 mol % or less.

7. The multilayer ceramic capacitor according to claim 1, wherein
the outer dielectric layers include side margin portions on both sides of the inner layer portion in a width direction intersecting the lamination direction and the length direction; and
the side margin portions each include a plurality of layers in the width direction, and a molar ratio of Si to Ti in an outermost side margin portion is greater than a molar ratio of Si to Ti in an innermost side margin portion.

8. The multilayer ceramic capacitor according to claim 1, wherein the inner dielectric layers each have a thickness of about 0.4 μm or more and about 0.5 μm or less.

9. The multilayer ceramic capacitor according to claim 1, wherein the inner dielectric layers each have a thickness of about 0.4 μm or more and about 0.45 μm or less.

10. The multilayer ceramic capacitor according to claim 1, wherein the internal electrode layers each have a thickness of about 0.3 μm or more and about 0.4 μm or less.

11. The multilayer ceramic capacitor according to claim 1, wherein the internal electrode layers each have a thickness of about 0.3 μm or more and about 0.35 μm or less.

12. The multilayer ceramic capacitor according to claim 1, wherein the outer dielectric layers each include Ni.

13. The multilayer ceramic capacitor according to claim 1, wherein a displacement of positions of ends in a width direction intersecting the lamination direction and the length direction, of the plurality of internal electrode layers stacked in the lamination direction is about 5 μm or less.

14. The multilayer ceramic capacitor according to claim 1, wherein the grains include barium titanate-based ceramics including Ba and Ti.

15. The multilayer ceramic capacitor according to claim 14, wherein each of grains includes at least one of La, Ce, Pr, Nd, Sm, Eu, Gd, Tb, Dy, Ho, Er, Tm, Yb, Lu, or Y as a subcomponent.

16. The multilayer ceramic capacitor according to claim 1, wherein a number of the inner dielectric layers is 100 or more and 2000 or less.

17. The multilayer ceramic capacitor according to claim 1, wherein each of the internal electrode layers includes Ni as a main component.

18. The multilayer ceramic capacitor according to claim 17, wherein each of the internal electrode layers includes dielectric particles.

19. The multilayer ceramic capacitor according to claim 1, wherein a number of the internal electrode layers is 10 or more and 1000 or less.

* * * * *